United States Patent Office 3,480,327
Patented Nov. 25, 1969

3,480,327
EXCAVATION TYPE SHIELD WITH CONCENTRIC ROTARY CUTTER BARRELS
Kunijiro Matsushita, Nagoya, Japan, assignor to Kumagai Gumi Company Limited, Fukui, Japan
Continuation of application Ser. No. 527,224, Feb. 14, 1966. This application June 13, 1968, Ser. No. 740,770
Claims priority, application Japan, Feb. 19, 1965, 40/9,577
Int. Cl. E21d 23/00; E21c 1/10, 35/02
U.S. Cl. 299—33                                                  1 Claim

ABSTRACT OF THE DISCLOSURE

A rotary head tunneling machine adapted for excavating tunnels comprising a slidably advancing shield rotatably supporting at its front end a cutting barrel. The slidably advancing shield serves to withstand the reaction force exerted thereto by the friction produced between the tunnel force and the shield and is short in length and light in weight and makes it possible to rotatably support at its front end the cutting barrel for excavating the tunnel and assemble at its rear end cover rings in a simple and easy manner. The cutting barrel comprises two concentric barrel elements, the front face of each consists of a disc plate formed by several segments connected together by radial flanges. The front face is formed with radially extending slits having knife edges secured to a side of the slits.

---

This application is a continuation of application Ser. No. 527,224, filed Feb. 14, 1966 and now abandoned.

This invention relates to an excavation type shield for use in excavating tunnels in the non-cohesive ground of soil or sand bed other than cohesive rock bed without rotating the shield.

In this kind of excavation type shield a rotary cutter is rotatably journalled by a center shaft.

If it is desired to excavate a tunnel having a large diameter, a large rotary cutter has to be employed. Thus, it is necessary to provide a number of radial and thrust bearings for the purpose of distributing excessive thrust to be subjected to the rotary cutter. One of these radial and thrust bearings serves to support the center shaft of the rotary cutter, while the other radial and thrust bearings are arranged to support the rotary cutter at the outer periphery thereof.

The provision of the center shaft and the bearings thereof, however, results in disadvantages that the construction of the excavation type shield becomes complex and that the muck of ground produced in the course of excavation of the tunnel could not be discharged through the rotary cutter owing to the presence of the center shaft and bearings thereof.

An object of the invention is to provide an improved excavation type shield, and which is particularly constructed so as to obviate the above mentioned center shaft and bearings thereof for supporting the rotary cutter.

These and other objects which will become apparent in light of the following detailed description are achieved according to the invention by providing a tunneling machine which comprises a slidably advancing shield and associated cutting means mounted on a barrel having a large diameter and rotatable just inside the shield periphery whereby a clear passage is provided for moving earth rearward of the advancing cutting means. The shield is the outermost part of the device and is restrained from rotation by frictional contact with the earth forming the tunnel wall. The cutting means are advanced by advancing the shield. The cutting means are actuated by rotation relative to the shield and the cutting and advancing motions may be synchronized.

For a better understanding of the invention, reference is taken to the accompanying drawings, in which:

FIGS. 1 to 3 show an embodiment of the invention which makes use of a double rotating cutter.

Figure 1:
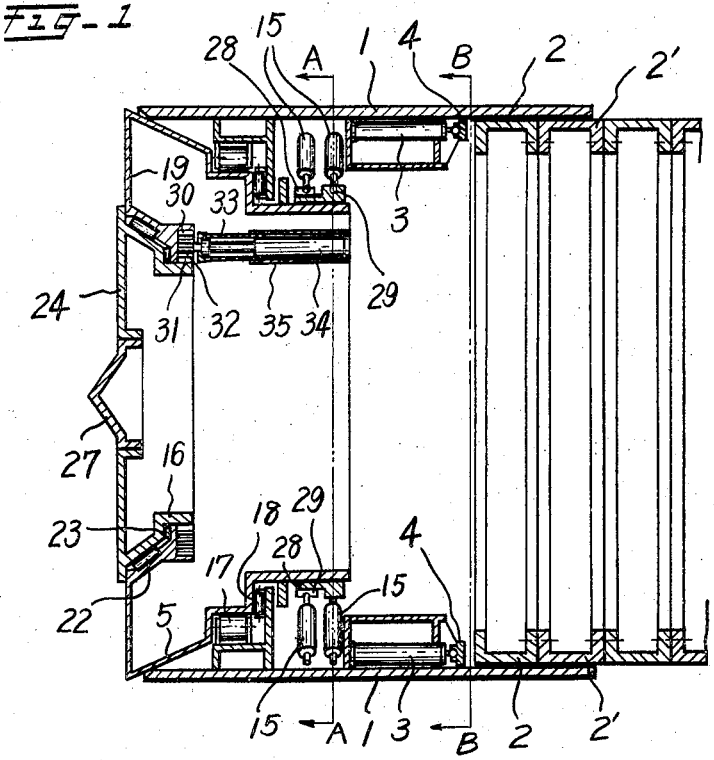
FIG. 1 is a longitudinal sectional view.
Figure 2:
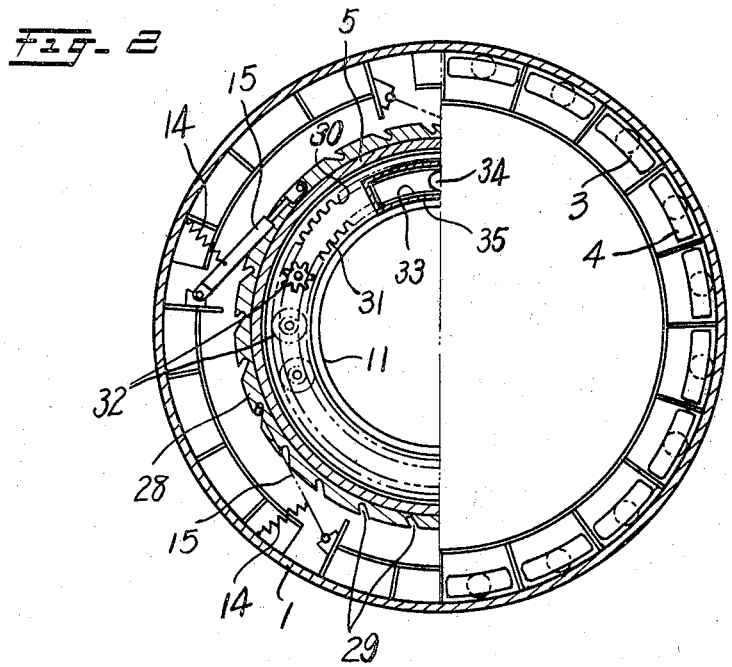
FIG. 2 shows in its left half a section on line A—A of FIG. 1 and in its right half a section of line B—B of FIG. 1.
Figure 3:
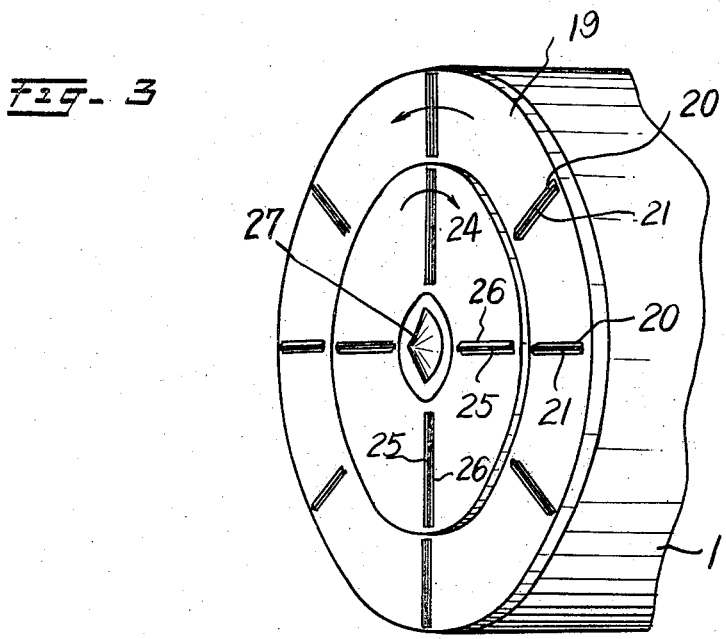
FIG. 3 is a perspective view of the cutting face of FIG. 1.

In the embodiment shown in FIGS. 1 to 3, a rotary cutter comprises a main barrel 5 open at both ends and an auxiliary barrel 16 also open at both ends.

The main barrel 5 is rotatably journalled by radial bearing rollers 17 and thrust bearing rollers 18 mounted on the supporting frame secured to the shield 1. The front open end of the main barrel 5 is closed by a disc plate 19 which is provided with radially extending slits 20 having knife edges 21 secured to one respective side of the slits 20. The knife edges 21 are so designed that when the main barrel 5 is rotated in a counter clockwise direction as shown by an arrow in FIG. 3 and pushed forwards to the ground bed the knife edges 21 act to excavate the ground bed and the muck of ground produced can be discharged through the slits 20 backwards.

The main barrel 5 includes several members and therefore the disc plate 19 includes several segments connected together by flanges. The slits 20 are formed at junctions of the radially extending flanges.

The auxiliary barrel 16 is concentrically arranged in the main barrel 5 and is rotatably journalled in the main barrel 5 by means of radial bearing rollers 22 and thrust bearing rollers 23.

The auxiliary barrel 16 is closed at its front end by a disc plate 24 which is provided with radially extending slits 25 having knife edges 26 secured to one respective side of the slits 25. The knife edges 26 are so designed that when the auxiliary barrel 16 is rotated in a clockwise direction as shown by an arrow in FIG. 3 and pushed forwards to the ground bed the knife edges 26 act to excavate the ground bed and the muck of ground produced can be discharged through the slits 25 backwards.

The outer peripheral edge portion of the disc plate 24 of the auxiliary barrel 16 is slidably engaged with the inner peripheral edge portion of the disc plate 19 of the main barrel 5.

The auxiliary barrel 16 includes several members, which, if desired, can be separated and removed. Thus, the disc plate 24 includes several segments connected together by flanges. The slits 25 are formed at junctions of the radially extending flanges.

A conical cutter 27 is detachably mounted to a center opening of the disc plate 24 and adapted to close the center opening and guide the straight movement of the main barrel 5 and the auxiliary barrel 16. The conical cutter 27 may be removed if desired to discharge the muck of ground produced.

The main barrel 5 is provided at its rear outer side surface with a ring 28 secured thereto. The ring 28 is connected through oil jacks 15 to the frame of the shield 1. The number of the jacks 15 and the rings 28 may be increased when a large type shield 1 is used. In the embodiment shown, provision is made of two rings 28 and each ring 28 is provided with a series of notches 29. The pitch of the notches 29 of one ring 28 is displaced by a half pitch of the notches 29 of the other ring 28. Between the oil jack 15 and the shield 1 are inserted springs 14 which serve to press the oil jack 15 against the ring 28 and brought the plunger end of the jack 15 into engagement with the notch 29.

The main barrel 5 is provided at the inside surface of its front opening with an internal gear 30 and the auxiliary barrel 16 is provided at the outside surface of its rear opening with an external gear 31. A plurality of groups of intermediate gears 32 are inserted between the internal gear 30 and the external gear 31. Each shaft for supporting each group of these intermediate gears 32 is supported by a common supporting member 33 which is sildably inserted in a casing 35 of an oil jack 34.

The operation of the embodiment shown in FIGS. 1 to 3 is as follows:

After the segments have been assembled together to form a new cover ring 2 and connected to the existing cover ring 2′, the oil jack 3 becomes operated to push its plunger end 4 against the newly assembled ring 2, which results in forward movement of the shield 1 together with the jack 3 towards the ground bed. At the same time the oil jacks 15 become operated to push the plunger ends thereof against the ring 28. The plunger ends become engaged with the notches 29 thus rotating the ring 28 and hence the main barrel 5. As soon as the oil jacks 15 associated with one of the rings 28 reach the extended ends thereof the oil jacks 15 associated with the other ring 28 take part in rotating the main barrel 5 through the notches 29. While the oil jacks associated with one ring 28 become contracted to ready for the next cycle.

Thus, it is possible to rotate the main barrel 5 and also move forwards the shield 1 by controlling the oil jacks 3 and 15.

As the main barrel 5 rotates the auxiliary barrel 16 is caused to be rotated through the intermediate gear 32 in mesh with the internal and external gears 30 and 31, respectively, in a direction opposite to that of the main barrel 5. The knife edges 21 and 26 of the disc plates 19 and 24 associated with the main and auxiliary barrels 5 and 16 rotate in directions opposite each other to excavate the ground bed and the muck of ground produced can be discharged rearwards through the slits 20 and 25. The muck of ground thus discharged may be conveyed rearwards by means of a conveyor (not shown) with its charging end arranged in the main barrel 5.

In case of excavating a relatively coherent ground bed the auxiliarly barrel 16 may be omitted. In this case the jack 34 becomes contracted to withdraw the intermediate gear 30 from the interior and exterior gears 30 and 31 thus separating the auxiliary barrel 16 from the main barrel 5. Alternatively, the conical cutter 27 only be removed from the auxiliarly barrel 16.

The excavation type shield as above mentioned makes use of the main and auxiliary barrels 5 and 16 both having large inside diameters instead of providing a rotating shaft so that the muck of the ground produced by the rotation of the conical cutter 27, the knife edges 21 and 26 can easily be transferred to the conveyor arranged within the space formed inside the main and auxiliary barrels 5 and 16. Moreover, the embodiment shown in FIGS. 1 to 3 makes it possible to change the manner of excavating the ground bed. That is, in case of excavating the sandy bed both of the main and auxiliary barrels 5 and 16 are used to excavate the sandy ground with the aid of the double cutter comprising two disc plates 19 and 24. But, if it is desired to excavate the coherent ground bed the conical cutter 27 or the auxiliary barrel 16 may be removed. Thus, the invention provides a stable and effective excavation for any kind of ground beds.

Moreover, the rotary cutter comprises the main and auxiliary barrels 5 and 16 adapted to be rotated in opposite direction which permit the excavating torques subjected to the ground bed to be compensated each other, thereby driving the shield 1 straight forwards without rotating it.

Furthermore, the rotary cutter may be started by using the main barrel 5 only in an easy and positive manner.

As explained hereinbefore the use of the single or double rotary cutter comprising the barrel having the large inside diameter ensures omission of the center shaft for driving the cutter and provision of a large space to be used for discharging the muck of ground and further provides the important advantages that the number of the radial and thrust bearings can be minimized.

It may be clear that the invention is not restricted to the embodiments described and that many variations are possible for those skilled in the art without leaving the scope of the invention.

I claim:

1. A rotary head tunneling machine comprising a shield, a main barrel provided at its front end with a disc plate including several segments connected together by radially extending flanges and formed with radially extending slits having knife edges secured to one respective side of said slits and removably journalled for rotation in said shield, an auxiliary barrel provided at its front end with a disc plate including several segments connected together by radially extending flanges and formed with radially extending slits having knife edges secured to one respective side of said slits and removably journalled for rotation in said main barrel, said auxiliary barrel including a conical cutter removably attached to close an opening formed in said auxiliary barrel, and a gear means including an interior gear formed along the inside surface of said main barrel, an exterior gear formed along the outside surface of said auxiliary barrel, and an intermediate gear slidably inserted between said interior and exterior gears and driven by an oil jack and removably journalled for rotation in said shield.

References Cited

UNITED STATES PATENTS

| 1,317,586 | 9/1919 | Mack | 175—106 X |
| 1,639,215 | 8/1927 | De Grassi | 299—90 X |
| 2,760,766 | 8/1956 | Mayo | 299—31 |
| 2,864,599 | 12/1958 | Masoni | 299—90 X |
| 2,811,341 | 10/1957 | Robbins | 299—90 X |
| 3,309,142 | 3/1967 | Winberg | 299—33 |
| 3,328,971 | 7/1967 | Boessner | 299—58 X |

FOREIGN PATENTS

| 1,424 | 1876 | Great Britain. |
| 934,996 | 1963 | Great Britain. |

ERNEST R. PURSER, Primary Examiner

U.S. Cl. X.R.

299—60, 86